(12) United States Patent
Kaitha et al.

(10) Patent No.: US 11,088,961 B2
(45) Date of Patent: Aug. 10, 2021

(54) MONITORING DATA STREAMS AND SCALING COMPUTING RESOURCES BASED ON THE DATA STREAMS

(71) Applicant: Capital One Services, LLC, McLean, VA (US)

(72) Inventors: Sunil Kaitha, Plano, TX (US); Japan Bhatt, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/740,718

(22) Filed: Jan. 13, 2020

(65) Prior Publication Data
US 2020/0153751 A1 May 14, 2020

Related U.S. Application Data

(63) Continuation of application No. 16/382,875, filed on Apr. 12, 2019, now Pat. No. 10,536,392, which is a (Continued)

(51) Int. Cl.
*G06F 15/173* (2006.01)
*H04L 12/911* (2013.01)
(Continued)

(52) U.S. Cl.
CPC .............. *H04L 47/70* (2013.01); *H04L 41/06* (2013.01); *H04L 41/0896* (2013.01);
(Continued)

(58) Field of Classification Search
CPC ..... H04L 47/70; H04L 67/1008; H04L 67/10; H04L 65/1093; H04L 65/403;
(Continued)

(56) References Cited

U.S. PATENT DOCUMENTS 6,230,183 B1 * 5/2001 Yocom ................. G06F 9/5061
                                                      718/105
6,470,406 B1 * 10/2002 Dillenberger .......... G06F 9/505
                                                      379/255
(Continued)

OTHER PUBLICATIONS

Barr J., "AWS Auto Scaling," Jan. 16, 2018, 9 pages. Retrieved from Internet:[https://aws.amazon.com/autoscaling/].
(Continued)

*Primary Examiner* — Richard G Keehn
(74) *Attorney, Agent, or Firm* — Harrity & Harrity, LLP

(57) ABSTRACT

A device may determine values for a set of metrics related to a set of event messages being processed, by a set of server devices, from a set of queues. The values for the set of metrics may be determined as the set of event messages are being processed. Each of the set of queues may be associated with a different subset of event messages and a different subset of server devices. The device may determine to scale a quantity of server devices included in the set of server devices. The quantity of server devices may be scaled to increase the quantity of server devices or to decrease the quantity of server devices. The device may provide a set of instructions to scale the quantity of server devices. The device may perform an action to facilitate accessibility of data related to processing of the set of event messages.

20 Claims, 5 Drawing Sheets

Related U.S. Application Data continuation of application No. 15/904,084, filed on Feb. 23, 2018, now Pat. No. 10,277,524.

(51) Int. Cl.
*H04L 12/24* (2006.01)
*H04L 29/08* (2006.01)
*H04L 29/06* (2006.01)

(52) U.S. Cl.
CPC ............ *H04L 41/14* (2013.01); *H04L 41/147* (2013.01); *H04L 65/1046* (2013.01); *H04L 65/1093* (2013.01); *H04L 65/403* (2013.01); *H04L 67/10* (2013.01); *H04L 67/1008* (2013.01)

(58) Field of Classification Search
CPC ... H04L 65/1046; H04L 41/14; H04L 41/147; H04L 41/06; H04L 41/0896
See application file for complete search history.

(56) References Cited

U.S. PATENT DOCUMENTS

| | | | |
|---|---|---|---|
| 8,856,797 B1 | 10/2014 | Siddiqui et al. | |
| 9,032,070 B1 | 5/2015 | Stickle et al. | |
| 9,420,104 B1* | 8/2016 | Lintner | G06Q 30/016 |
| 10,277,524 B1 | 4/2019 | Kaitha et al. | |
| 10,536,392 B2 | 1/2020 | Kaitha et al. | |
| 2003/0177128 A1* | 9/2003 | Bradley | G06F 16/242 |
| 2005/0240465 A1* | 10/2005 | Kiran | G06Q 10/10 |
| | | | 705/7.25 |
| 2011/0208875 A1* | 8/2011 | Hasson | G06F 9/5094 |
| | | | 709/238 |
| 2012/0254444 A1* | 10/2012 | Harchol-Balter | G06F 9/5083 |
| | | | 709/226 |
| 2013/0198637 A1* | 8/2013 | Childers, Jr. | H04L 41/5064 |
| | | | 715/735 |
| 2015/0339159 A1* | 11/2015 | Gupta | G06F 9/50 |
| | | | 718/105 |
| 2016/0196812 A1* | 7/2016 | Rashad | G06Q 10/101 |
| | | | 84/609 |
| 2016/0323377 A1 | 11/2016 | Einkauf et al. | |
| 2017/0019462 A1* | 1/2017 | Hara | G06F 9/5083 |
| 2018/0034904 A1* | 2/2018 | Roy | G06F 11/2033 |
| 2019/0036967 A1* | 1/2019 | Castilho | H04L 41/082 |
| 2019/0102719 A1* | 4/2019 | Singh | H04L 41/5025 |
| 2019/0250954 A1* | 8/2019 | Sethi | G06F 11/0793 |
| 2020/0250774 A1* | 8/2020 | Agarwal | H04Q 9/00 |

OTHER PUBLICATIONS

RED5PRO., "Red5 Pro Autoscaling and Stream Manager," Jun. 8, 2016, 9 pages. Retrieved from Internet:[https://www.red5pro.com/docs/autoscale/].

Wikipedia, "Autoscaling," Aug. 30, 2017, 8 pages. Retrieved from Internet:[https://en.wikipedia.org/wiki/Autoscaling].

* cited by examiner

MONITORING DATA STREAMS AND SCALING COMPUTING RESOURCES BASED ON THE DATA STREAMS

RELATED APPLICATIONS

This application is a continuation of U.S. patent application Ser. No. 16/382,875, filed Apr. 12, 2019 (now U.S. Pat. No. 10,536,392), which is a continuation of U.S. patent application Ser. No. 15/904,084, filed Feb. 23, 2018 (now U.S. Pat. No. 10,277,524), the contents of which are incorporated herein by reference.

BACKGROUND

Auto-scaling is a method used in cloud computing where an amount of computing resources (e.g., servers in a server farm or data center) is scaled automatically. For example, a quantity of active computing resources may be scaled based on a load of the computing resources. Auto-scaling may include scheduled scaling, where computing resources are scaled at a scheduled time. In addition, auto-scaling may include predictive scaling, where computing resources are scaled based on using predictive analytics.

SUMMARY

According to some possible implementations, a device may comprise one or more memories; and one or more processors, communicatively coupled to the one or more memories, to determine values for a set of metrics related to a set of event messages being processed, by a set of server devices, from a set of queues. The set of metrics may include lag-related metrics. The values for the set of metrics may be determined as the set of event messages are being processed. Each of the set of queues may be associated with a different subset of event messages and a different subset of server devices. The one or more processors may determine to scale a quantity of server devices included in the set of server devices based on the values for the set of metrics. The quantity of server devices may be scaled to increase the quantity of server devices or to decrease the quantity of server devices. The one or more processors may provide a set of instructions to scale the quantity of server devices included in the set of server devices after determining to scale the quantity of server devices. The one or more processors may perform an action to facilitate accessibility of data related to processing of the set of event messages in association with providing the set of instructions.

According to some possible implementations, a non-transitory computer-readable medium may store one or more instructions that, when executed by one or more processors, may cause the one or more processors to determine values for a set of metrics related to a set of event messages being processed, by a set of server devices, from a set of queues. Each of the set of queues may be associated with a different subset of event messages and a different subset of server devices. The one or more instructions, when executed by the one or more processors, may cause the one or more processors to determine to modify a quantity of server devices included in the set of server devices based on the values for the set of metrics. The quantity of server devices may be modified to increase the quantity of server devices or to decrease the quantity of server devices. The quantity of server devices may be modified for one or more subsets of server devices associated with the set of queues. The one or more instructions, when executed by the one or more processors, may cause the one or more processors to provide a set of instructions to modify the quantity of server devices included in the set of server devices after determining to scale the quantity of server devices. The set of instructions may be associated with modifying the quantity of server devices for the one or more subsets of server devices associated with the set of queues. The one or more instructions, when executed by the one or more processors, may cause the one or more processors to perform an action to facilitate accessibility of data related to processing of the set of event messages in association with providing the set of instructions.

According to some possible implementations, a method may include determining, by a device, values for a set of metrics related to a set of event messages being processed, by a set of server devices, from a set of queues. The values for the set of metrics may be determined as the set of event messages are being processed. Each of the set of queues may be associated with a different subset of event messages and a different subset of server devices. The method may include determining, by the device, to scale a quantity of server devices included in the set of server devices based on the values for the set of metrics. The quantity of server devices may be scaled to increase the quantity of server devices or to decrease the quantity of server devices. The method may include providing, by the device, a set of instructions to scale the quantity of server devices included in the set of server devices after determining to scale the quantity of server devices. The method may include performing, by the device, an action to facilitate accessibility of data related to processing of the set of event messages in association with providing the set of instructions.

DETAILED DESCRIPTION

The following detailed description of example implementations refers to the accompanying drawings. The same reference numbers in different drawings may identify the same or similar elements.

Typically, auto-scaling computing resources includes the use of historical information to identify and/or predict particular times when consumption of the computing resources might satisfy a threshold (e.g., to identify and/or predict high consumption times or low consumption times). While this technique can help to ensure that an adequate amount of computing resources are available during high-consumption times and/or to optimize available computing resources during low-consumption times, this technique is not well suited for real-time fluctuations in demand for the computing resources. As a result, unexpected fluctuations in demand for the computing resources can disrupt operation of the computing resources, can negatively impact a user experience of the computing resources (e.g., when the computing resources are associated with an application, a webpage, etc. used by the user), and/or the like.

Some implementations described herein provide a streaming data platform that is capable of monitoring event messages in a set of queues associated with a set of computing resources and dynamically scaling the set of computing resources based on monitoring the event messages. In this way, the streaming data platform may determine an amount of lag and/or another issue associated with processing of the event messages associated with the set of computing resources (e.g., preemptively before the lag has a noticeable impact on a performance of the computing resources) and may scale the computing resources based on the amount of lag and/or the other issue. This reduces an amount of time needed to process a queue of event messages by facilitating scaling of the computing resources used to process the event messages. In addition, this facilitates more accurate scaling of the computing resources, particularly at times when there is an abnormal amount of demand for the computing resources. Further, this reduces or eliminates a need for scheduled and/or predictive scaling based on information related to historical demand for computing resources, thereby conserving processing resources associated with scheduled and/or predictive scaling based on historical demand for the computing resources.

Figure 1:
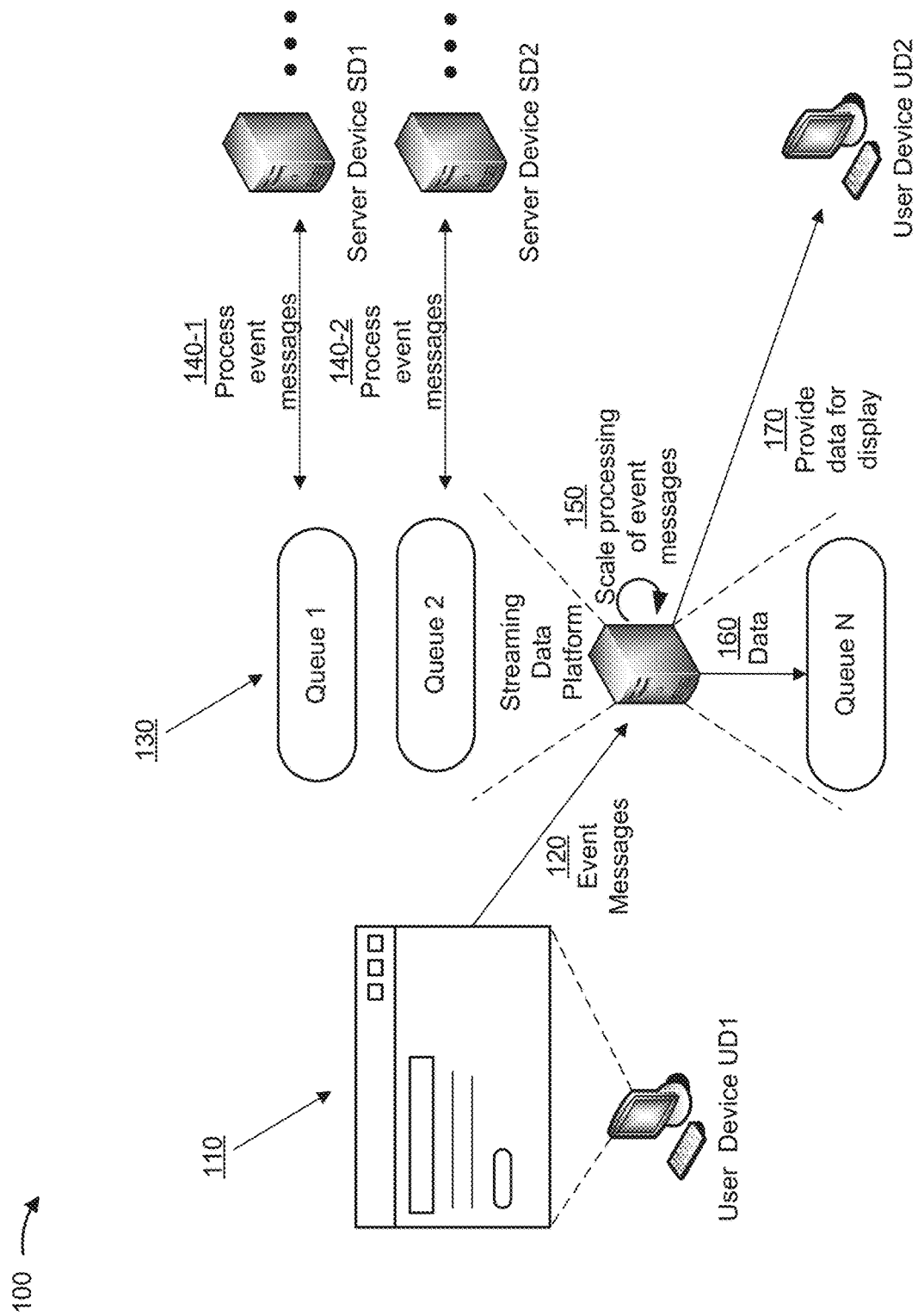
FIG. 1 is a diagram of an overview of an example implementation described herein.

FIG. 1 is a diagram of an overview of an example implementation 100 described herein. As shown in FIG. 1, implementation 100 includes multiple user devices (shown as user devices UD1 and UD2), a streaming data platform, and multiple sets of server devices (e.g., shown as a first set of server devices that includes server device SD1 and a second set of server devices that includes server device SD2).

As shown by reference number 110, a display associated with user device UD1 may display a user interface. For example, the user interface may be associated with an account (e.g., a bank account, a social media account, etc.), a system, and/or the like. A user of user device UD1 may interact with user interface elements of the user interface. For example, the user may select a button on the user interface, input text via a text box, toggle a control, and/or the like. As a specific example, the user may interact with the user interface elements to log into an account, to complete a bank transfer (e.g., when the account is a bank account), to update personal information associated with the account, and/or the like.

As shown by reference number 120, user device UD1 may provide, to the streaming data platform, event messages based on the user's interactions with the user interface elements. For example, the event messages may identify the user's interactions. These event messages may be processed by the first set of server devices and the second set of server devices to cause corresponding actions to be performed. For example, event messages related to a user's use of the user interface to log into an account may cause the first set of server devices and the second set of server devices to perform a set of actions related to providing the user with access to the account, such as processing credentials input by the user of user device UD1, providing an account homepage for display, and/or the like.

As shown by reference number 130, the streaming data platform may be associated with a set of queues (shown as "Queue 1," "Queue 2," and "Queue N"). The streaming data platform may use the queues to queue incoming unprocessed event messages for processing. As further shown in FIG. 1, each queue may be associated with a set of server devices that processes the event messages in the corresponding queue. For example, queue 1 may be associated with the first set of server devices that includes server device SD1 and queue 2 may be associated with the second set of server devices that includes server device SD2. As shown by reference numbers 140-1 and 140-2, the first and second sets of server devices may process event messages from corresponding queues.

As shown by reference number 150, the streaming data platform may scale processing of event messages. For example, while the first and second sets of server devices are processing the event messages, the streaming data platform may monitor a quantity of event messages in each of the queues and/or other information related to processing of the event messages. The streaming data platform may determine an amount of lag present for each of the queues (e.g., based on a quantity of event messages associated with each of the queues, based on a quantity of received event messages that have not yet been queued, etc.). Additionally, or alternatively, the streaming data platform may combine the determination of the amount of lag with other information related to the queues to determine whether the quantity of server devices in each set of server devices needs to be scaled. For example, the streaming data platform may, in addition to the amount of lag, determine whether network lag is present, whether the sets of server devices are experiencing lag with regard to processing the event messages, a trend related to processing of the event messages, and/or the like.

The streaming data platform may scale the quantity of server devices in each set of server devices up or down. For example, the streaming data platform may increase or decrease the quantity of server devices included in each set of server devices (e.g., by providing a set of instructions to power on additional server devices or to power down server devices). The streaming data platform may scale the set of server devices for each queue independently (e.g., some sets of server devices may be scaled up and other sets of server devices may be scaled down). Additionally, or alternatively, the streaming data platform may configure a server device included in a set of server devices to process event messages from multiple queues to scale processing of the event messages.

As shown by reference number 160, the data streaming platform may provide, to another queue (shown as "Queue N"), data related to a manner in which the sets of server devices were scaled. For example, the data may identify a quantity of server devices included in each set of server devices before and after scaling, a quantity of event messages associated with each queue when the streaming data platform scaled the sets of server devices, lag and/or other information related to the queues and/or the sets of server devices, and/or the like. The data provided to queue N may be available for processing, such as by a machine learning module, an analytics module, and/or the like, to improve future scaling by the streaming data platform, for threat detection, and/or the like.

As shown by reference number 170, the streaming data platform may provide, to user device UD2, the data for display (e.g., the data provided to queue N). For example, the data may be provided for display via a user interface, a dashboard, and/or the like. In this way, a user of user device UD2 may access a visualization of the data, a report related to the data, and/or the like.

In this way, the streaming data platform may dynamically, and in real-time or near real-time, scale a quantity of server devices used to process event messages in a set of queues. This improves processing of the set of event messages by reducing an amount of lag and/or another issue related to the processing of the set of event messages. In addition, this can prevent the sets of server devices from becoming overloaded, thereby conserving processing resources of the sets of server devices and/or improving processing of the sets of server devices. Further, this facilitates more reactive and more accurate scaling of the sets of server devices relative to using historical information, thereby improving scaling and/or operation of the sets of server devices.

As indicated above, FIG. 1 is provided merely as an example. Other examples are possible and may differ from what was described with regard to FIG. 1. For example, although FIG. 1 was described with regard to server devices, the implementations apply equally to other types of computing resources, such as applications, containers, virtual machines, and/or the like. In addition, although FIG. 1 was described with regard to processing event messages, the implementations apply equally to other types of data, such as commands, requests, and/or the like.

Figure 2:
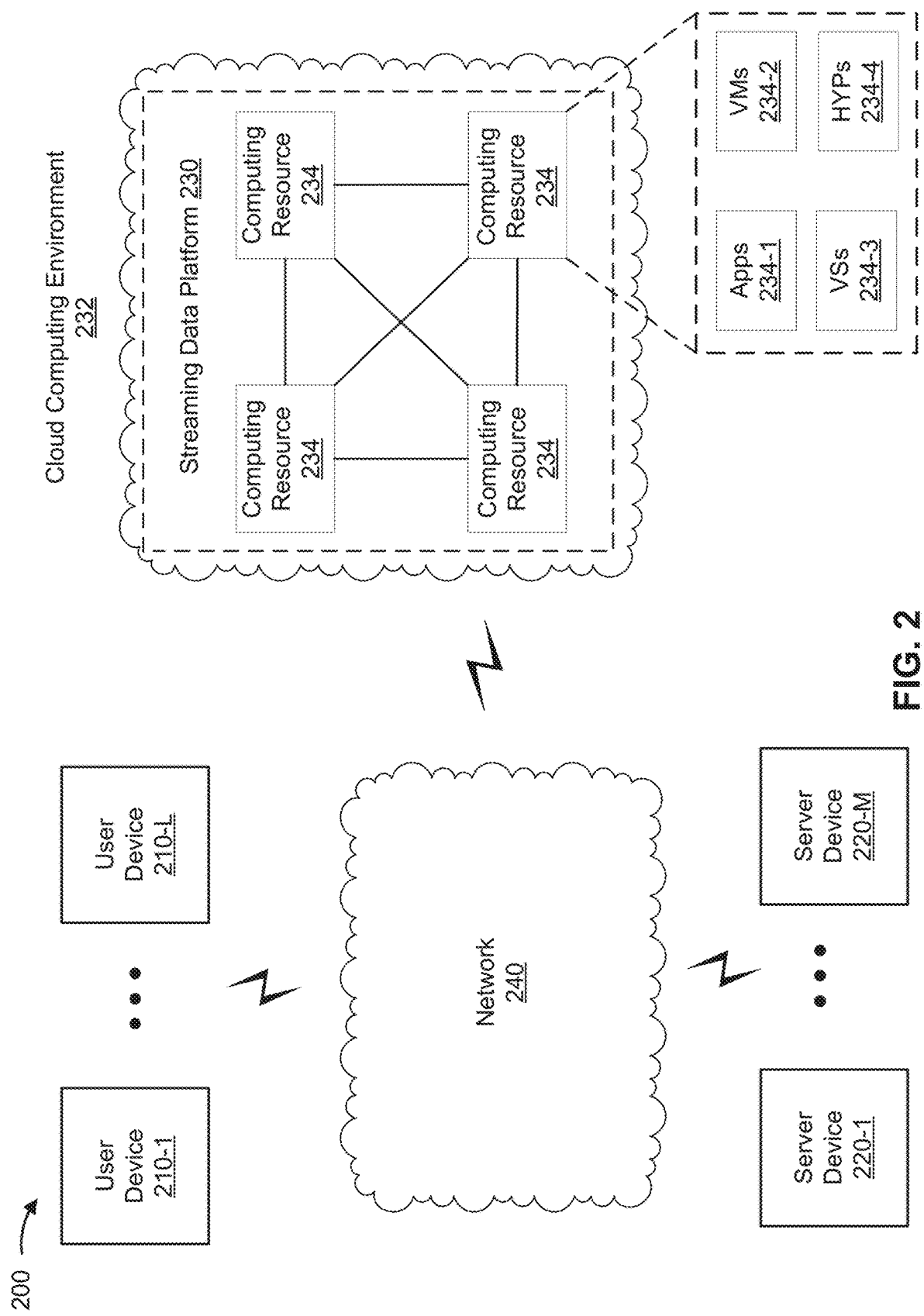
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210-1 through user device 210-L (L≥1), server device 220-1 through server device 220-M (M≥1), a streaming data platform 230 within cloud computing environment 232 that includes a set of computing resources 234, and a network 240. Devices of environment 200 may interconnect via wired connections, wireless connections, or a combination of wired and wireless connections.

User device 210 includes one or more devices capable of receiving, generating, storing, processing, and/or providing information associated with interactions of a user of user device 210 with a user interface provided for display via a display associated with user device 210. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. In some implementations, user device 210 may provide, to streaming data platform 230, event messages associated with interactions of a user of user device 210 with a user interface provided for display via a display associated with user device 210, as described elsewhere herein.

Server device 220 includes one or more devices capable of receiving, generating, storing, processing, and/or providing information associated with event messages received from user device 210. For example, server device 220 may include a server (e.g., in a data center or a cloud computing environment), a data center (e.g., a multi-server micro data center), a workstation computer, a virtual machine (VM) implemented on a computing device provided in a cloud computing environment, or a similar type of device. In some implementations, a computing resource (e.g., computing resource 234) may include one or more server devices 220. In some implementations, server device 220 may include one or more computing resources (e.g., one or more computing resources 234). In some implementations, server device 220 may process event messages received from user device 210, as described elsewhere herein. Additionally, or alternatively, server device 220 may receive, from streaming data platform 230, an instruction to modify an operation of server device 220 (e.g., based on streaming data platform 230 determining to scale computing resources used to process event messages), as described elsewhere herein. In some implementations, server device 220 may be a physical device implemented within a housing, such as a chassis. In some implementations, server device 220 may be a virtual device implemented by one or more computer devices of a cloud computing environment or a data center.

Streaming data platform 230 includes one or more devices capable of monitoring processing of event messages by a set of computing resources and automatically scaling processing of the event messages. For example, streaming data platform 230 may include a cloud server or a group of cloud servers. In some implementations, streaming data platform 230 may be designed to be modular such that certain software components can be swapped in or out depending on a particular need. As such, streaming data platform 230 may be easily and/or quickly reconfigured for different uses.

In some implementations, as shown in FIG. 2, streaming data platform 230 may be hosted in cloud computing environment 232. Notably, while implementations described herein describe streaming data platform 230 as being hosted in cloud computing environment 232, in some implementations, streaming data platform 230 may not be cloud-based (i.e., may be implemented outside of a cloud computing environment) or may be partially cloud-based.

Cloud computing environment 232 includes an environment that hosts streaming data platform 230. Cloud computing environment 232 may provide computation, software, data access, storage, and/or other services that do not require end-user knowledge of a physical location and configuration of a system and/or a device that hosts streaming data platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host streaming data platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with streaming data platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
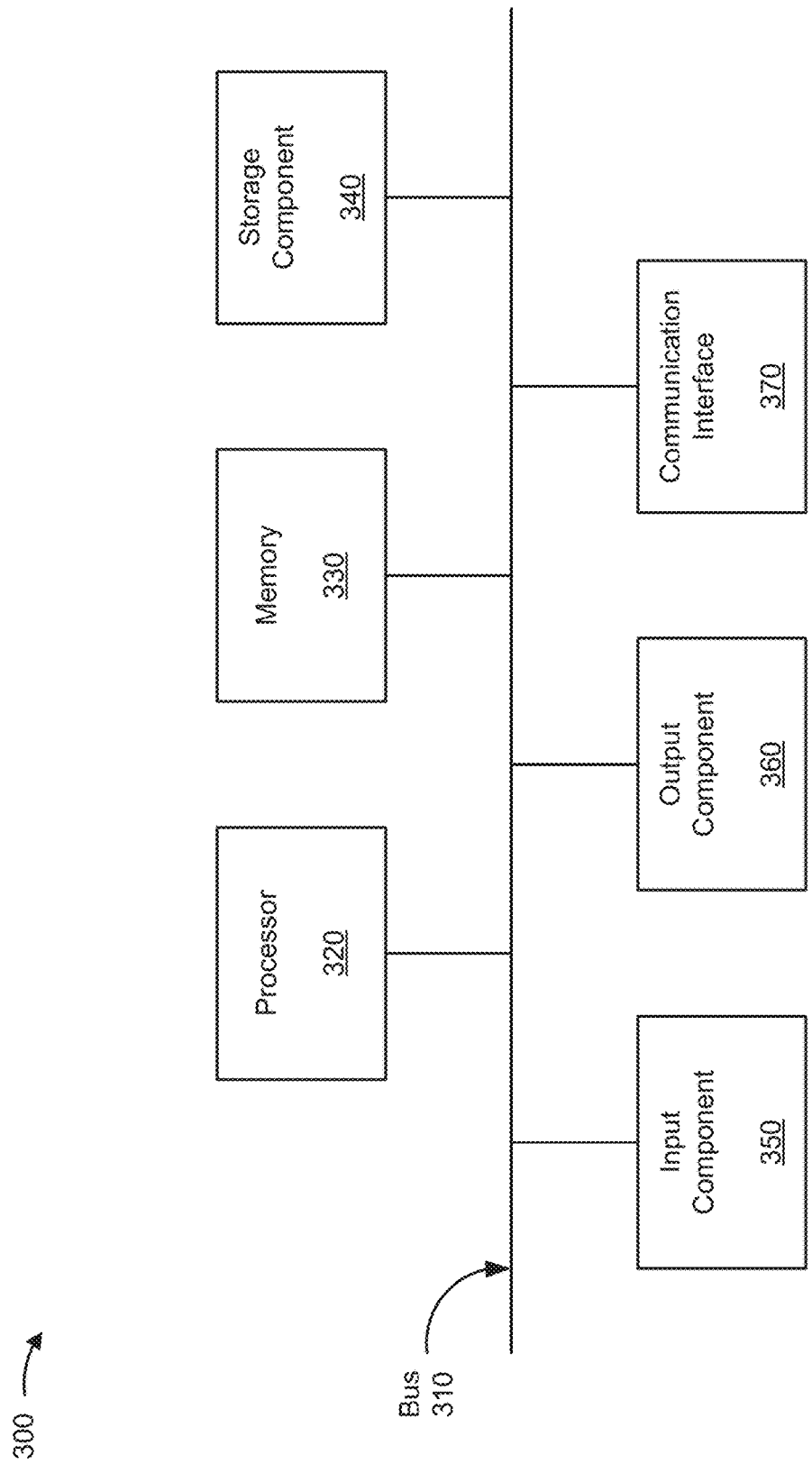
FIG. 3 is a diagram of example components of one or more devices of FIG. 2.

FIG. 3 is a diagram of example components of a device 300. Device 300 may correspond to user device 210, server device 220, streaming data platform 230, and/or computing resource 234. In some implementations, user device 210, server device 220, streaming data platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
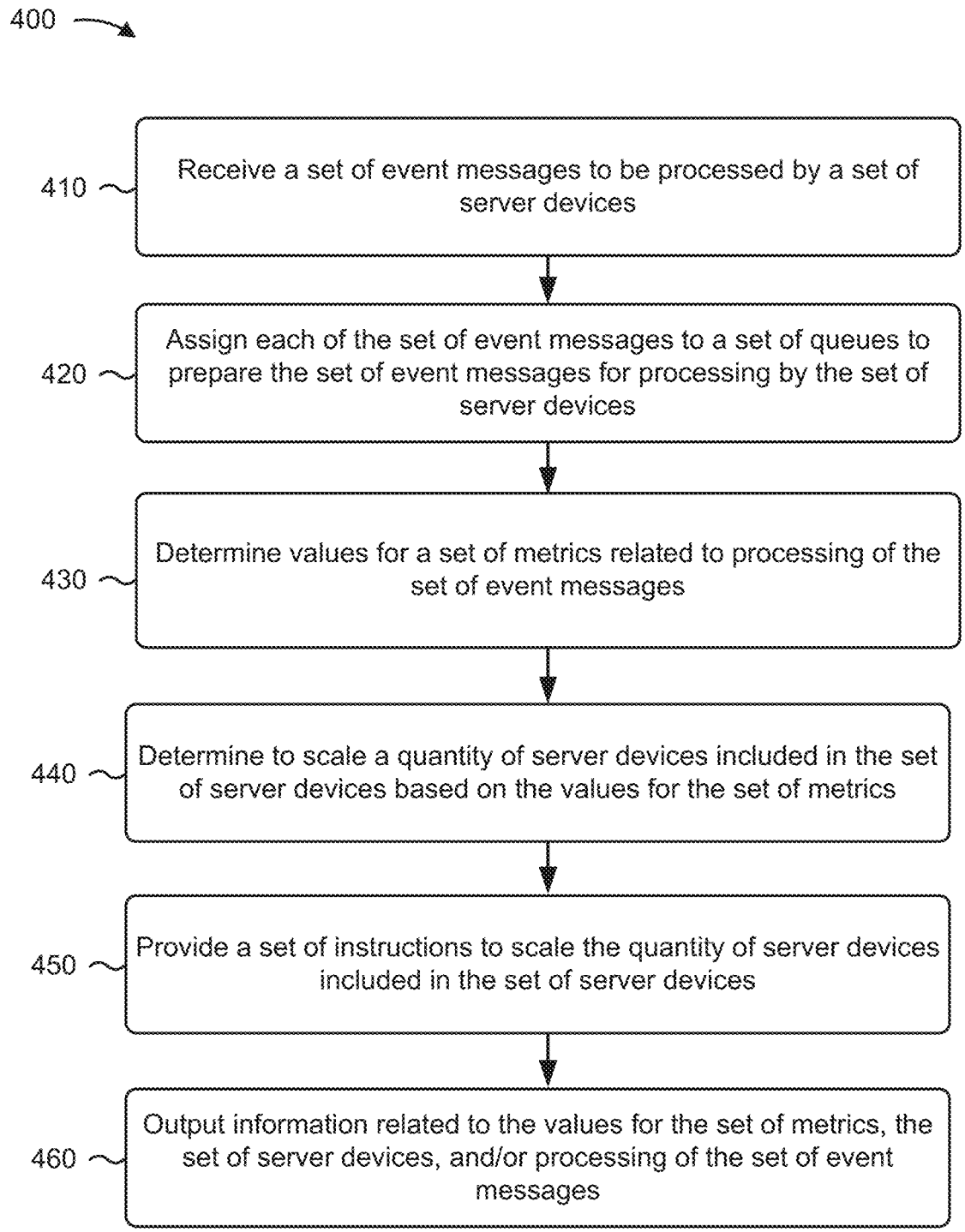
FIG. 4 is a flow chart of an example process for monitoring data streams and scaling computing resources based on the data streams.

FIG. 4 is a flow chart of an example process 400 for monitoring data streams and scaling computing resources based on the data streams. In some implementations, one or more process blocks of FIG. 4 may be performed by streaming data platform 230. In some implementations, one or more process blocks of FIG. 4 may be performed by another device or a group of devices separate from or including streaming data platform 230, such as user device 210, server device 220, and computing resource 234.

As shown in FIG. 4, process 400 may include receiving a set of event messages to be processed by a set of server devices (block 410). For example, streaming data platform 230 may receive (e.g., using computing resource 234, processor 320, communication interface 370, and/or the like) a set of event messages to be processed by a set of server devices 220 and/or another type of computing resource (e.g., computing resource 234).

In some implementations, an event message may include a message, or other information, related to interactions of a user of user device 210 with a user interface (e.g., with user interface elements, such as a button, a text box, a toggle control, etc., of the user interface) displayed by a display associated with user device 210. For example, an event message, when processed, may cause server device 220 to perform an action. As specific examples, a set of event messages may cause server device 220 to provide various user interfaces for display (e.g., user interfaces associated with an account), to update an account, to modify a setting for an account, and/or the like. In some implementations, streaming data platform 230 may receive various types of event messages. For example, different types of event messages may be associated with different actions to be performed by server device 220 (e.g., an action related to logging a user into an account, an action related to modifying an account, an action related to updating a user interface element, etc.), different interactions of a user of user device 210 with a user interface (e.g., a button selection, text input, etc.), and/or the like.

In some implementations, streaming data platform 230 may receive a set of event messages for a set of interactions by a user of user device 210 with a user interface in real-time or near real-time (e.g., as the user is interacting with the user interface), periodically, according to a schedule, based on requesting the set of event messages, and/or the like. In some implementations, streaming data platform 230 may receive an event message from user device 210 (e.g., via network 240). In some implementations, streaming data platform 230 may receive hundreds, thousands, or more simultaneous (or near simultaneous) event messages associated with hundreds, thousands, or more users. In this way, streaming data platform 230 may receive a set of messages that cannot be processed manually or objectively (e.g., in a consistent manner) by a human actor. In some implementations, streaming data platform 230 may receive an event message via a module and/or a component associated with streaming data platform 230. For example, a message broker associated with streaming data platform 230 may receive an event message from user device 210.

In this way, streaming data platform 230 may receive a set of event messages prior to assigning each of the set of event messages to a set of queues for processing.

As further shown in FIG. 4, process 400 may include assigning each of the set of event messages to a set of queues to prepare the set of event messages for processing by the set of server devices (block 420). For example, streaming data platform 230 may assign (e.g., using computing resource 234, processor 320, communication interface 370, and/or the like) each of the set of event messages to a set of queues to prepare the set of event messages for processing by the set of server devices.

In some implementations, a queue may include a data structure in which a set of event messages is stored. In some implementations, a queue may include an ordered data structure, where the queue includes information that identifies an order in which a set of event messages was input into the queue. Additionally, or alternatively, event messages stored in a queue may be processed from the queue in a particular manner (e.g., in a first-in, first-out manner, in a priority order, and/or the like).

In some implementations, a queue may be associated with a type of event message, such that the queue stores a particular type of event message, may be priority-based (e.g., where event messages are stored in a queue based on being associated with a threshold priority), and/or the like. Conversely, a queue may be associated with multiple types of event messages, priorities, and/or the like. In some implementations, a set of server devices 220 may be associated with one or more queues (e.g., one or more queues associated with the same or different types of event messages). Additionally, or alternatively, a queue may be associated with one or more sets of server devices 220.

In some implementations, streaming data platform 230 may assign a set of event messages to a set of queues based on information related to the set of event messages and/or the set of queues. For example, streaming data platform 230 may load balance the set of messages across the set of queues so that a difference in a quantity of messages associated with each queue satisfies a threshold, so that a difference in an amount of processing resource used by different server devices 220 to process the set of event messages satisfies a threshold, and/or the like. In some implementations, streaming data platform 230 may assign a set of event messages to a queue that includes the same or different types of event messages.

In this way, streaming data platform 230 may assign each of the set of event messages to a set of queues prior to determining values for a set of metrics related to processing the set of event messages.

As further shown in FIG. 4, process 400 may include determining values for a set of metrics related to processing of the set of event messages (block 430). For example, streaming data platform 230 may determine (e.g., using computing resource 234, processor 320, communication interface 370, and/or the like) values for a set of metrics related to processing of the set of event messages (e.g., by server device 220). In some implementations, streaming data platform 230 may determine the values for the set of metrics as the set of event messages are being processed (e.g., in real-time or near real-time).

In some implementations, the set of metrics may include lag-related metrics (e.g., a set of metrics related to lag in processing the set of event messages). For example, lag-related metrics may include a quantity of event messages in a queue, an amount of time between a timestamp for when an event message is stored in a queue and a timestamp for when the event message is processed (or predicted to be processed, such as based on a rate of processing by server device 220 and a quantity of event messages to be processed by server device 220), and/or the like. Additionally, or alternatively, and as additional examples, the set of metrics may include an amount of network lag (e.g., an amount of time between a timestamp for when an event message was sent by user device 210 and a timestamp for when streaming data platform 230 received the event message), a CPU utilization of server device 220, a memory utilization of server device 220, historical information related to a demand for processing by server device 220 (e.g., the historical information may identify particular times of the day or days of the week that are higher demand times or lower demand times), and/or the like.

In some implementations, streaming data platform 230 may determine the values for the set of metrics by monitoring information related to the set of event messages, processing of the set of event messages by server device 220, and/or the like. In some implementations, a module and/or a component associated with streaming data platform 230 may monitor the values and may provide information identifying the values to another module and/or component associated with streaming data platform 230. For example, a message broker associated with streaming data platform 230 may monitor the values for the set of metrics and may provide information identifying the values to a stream tracker associated with streaming data platform 230.

In some implementations, streaming data platform 230 may determine a score for a set of metrics. For example, streaming data platform 230 may determine a score for each of the set of metrics (e.g., based on a value for each of the metrics satisfying a threshold, being within a threshold amount of a historical average value, being within a threshold amount of an expected value, etc.). In some implementations, and continuing with the previous example, streaming data platform 230 may determine an overall score for a set of metrics (e.g., an average of each score for each of the set of metrics, by applying a function to the scores for each of the set of metrics, a weighted score where different metrics are associated with different weights, etc.). In some implementations, streaming data platform 230 may use the score to determine whether to scale a quantity of server devices 220 processing the set of event messages, as described elsewhere herein.

In this way, streaming data platform 230 may determine values for a set of metrics prior to determining to scale a quantity of server devices 220.

As further shown in FIG. 4, process 400 may include determining to scale a quantity of server devices included in the set of server devices based on the values for the set of metrics (block 440). For example, streaming data platform 230 may determine (e.g., using computing resource 234, processor 320, communication interface 370, and/or the like) to scale (e.g., modify) a quantity of server devices 220 included in the set of server devices 220 based on the values for the set of metrics. In some implementations, streaming data platform 230 may determine to scale up (e.g., increase) a quantity of server devices 220 included in a set of server devices 220 or to scale down (e.g., decrease) a quantity of server device 220 included in a set of server devices 220.

In some implementations, streaming data platform 230 may determine to scale a quantity of server devices 220 included in the set of server devices 220 based on values for the set of metrics. For example, streaming data platform 230 may determine to scale a quantity of server devices 220 included in the set of server devices 220 based on a values for the set of metrics satisfying a threshold, being within a range of values, showing a trend of increasing or decreasing, and/or the like. Additionally, or alternatively, streaming data platform 230 may determine to scale a quantity of server devices 220 included in the set of server devices 220 based on a score for the set of metrics (e.g., separate scores for each metric or an overall score for the set of metrics). For example, streaming data platform 230 may determine to scale a quantity of server devices 220 included in the set of server device 220 based on the score satisfying a threshold, being within a range of scores, showing a trend of increasing or decreasing, and/or the like.

In some implementations, streaming data platform 230 may determine to scale a quantity of server devices 220 based on using a machine learning technique. For example, streaming data platform 230 may process values and/or scores for the set of metrics using a machine learning technique and may determine to scale the quantity of server devices 220 included in the set of server devices 220 based on a result of processing the values and/or the scores. In some implementations, a machine learning technique may be used to train a model on data that includes values and/or scores for different metrics and information that indicates whether the quantity of server devices 220 needs to be scaled. Using a machine learning technique in this manner facilitates optimization of computing resources used to process event messages by providing streaming data platform 230 with the capability to process unstructured data, to process large quantities of data that do not have easily discernable patterns and/or trends, to identify opportunities when scaling can improve processing of event messages based on combinations of values and/or scores for the set of metrics, and/or the like.

In some implementations, streaming data platform 230 may process data related to the set of event messages to predict that the quantity of server devices 220 included in the set of server devices 220 needs to be scaled. For example, streaming data platform 230 may process the data using a machine learning module, to identify a pattern and/or a trend in the data, and/or the like to predict that the quantity of server devices 220 included in the set of server devices 220 needs to be scaled.

In some implementations, streaming data platform 230 may determine to scale a subset of server devices 220 for a subset of the set of queues based on the values for the set of metrics. For example, streaming data platform 230 may determine to scale a first subset of server devices 220, rather than a second subset of server devices 220, based on the values for the set of metrics for the first subset of server devices 220 satisfying a threshold and the values for the set of metrics for the second subset of server devices 220 not satisfying the threshold. Continuing with the previous example, the first subset of server devices 220 and the second subset of server devices 220 may be associated with different queues, with processing different types of event messages, and/or the like.

In this way, streaming data platform 230 may determine a quantity of event messages in one or more queues, a quantity of event messages to be stored in one or more queues, and/or may determine other information related to the event messages and/or processing of the event messages, and/or the like to determine whether to scale server devices 220 (or other computing resources). For example, streaming data platform 230 may analyze event messages stored in one or more queues associated with streaming data platform 230, analyze event messages that streaming data platform 230 has received but has not stored in the one or more queues, and/or the like. In addition, in this way, streaming data platform 230 may perform this determination in real-time or near real-time to facilitate faster and/or more accurate scaling of computing resources based on changes in demand for the server devices 220.

In some implementations, streaming data platform 230 may determine an amount by which to scale the quantity of server devices 220 included in the set of server devices 220. For example, streaming data platform 230 may determine a quantity by which to scale the quantity of server devices 220 included in the set of server devices 220, a processing capacity by which to scale the quantity of server devices 220, and/or the like. In some implementations, streaming data platform 230 may determine an amount by which to scale the quantity of server devices 220 such that values for the set of metrics satisfy a threshold, such that scores for the set of metrics satisfy a threshold, such that each server device 220 has a threshold quantity of event messages, and/or the like.

In some implementations, streaming data platform 230 may determine an amount by which to scale a quantity of server devices 220 based on a quantity of event messages being received (e.g., in real-time or near real-time). For example, streaming data platform 230 may determine an amount by which to scale the quantity of server device 220 based on a percentage change in the quantity of event message satisfying a threshold, based on a trend in a change in the quantity of event messages, based on a change in the quantity of event messages satisfying threshold, and/or the like.

In some implementations, streaming data platform 230 may predict values for the set of metrics and/or scores for the set of metrics. For example, streaming data platform 230 may predict values and/or scores for the set of metrics for the modified quantity of server devices 220 using historical data that identifies different quantities of server devices 220, different quantities of event messages to be processed, and/or different values and/or scores for the set of metrics, using a machine learning technique, and/or the like. In this way, streaming data platform 230 may determine whether scaling the quantity of server devices 220 will be effective in reducing or eliminating an issue associated with processing the set of event messages (e.g., lag). This conserves processing resources that would otherwise be consumed scaling the quantity of server devices 220 in an ineffective manner.

In this way, streaming data platform 230 may determine to scale a quantity of server devices 220 prior to providing a set of instructions to scale the quantity of server devices 220.

As further shown in FIG. 4, process 400 may include providing a set of instructions to scale the quantity of server devices included in the set of server devices (block 450). For example, streaming data platform 230 may provide (e.g., using computing resource 234, processor 320, communication interface 370, and/or the like) a set of instructions to scale the quantity of server devices 220 included in the set of server devices 220. In some implementations, streaming data platform 230 may provide the set of instructions to server device 220. In some implementations, the set of instructions may be associated with modifying the quantity of server devices 220 for a subset of server devices 220 associated with the set of queues.

In some implementations, streaming data platform 230 may provide the set of instructions to cause one or more additional server devices 220 to process the set of event messages for a particular queue of the set of queues. For example, streaming data platform 230 may provide the set of instructions to a set of additional server devices 220 to cause the set of additional server devices 220 to power on and process the set of event messages for a particular queue. Additionally, or alternatively, streaming data platform 230 may provide the set of instructions to cause one or more server devices 220 to stop processing the set of event messages for a particular queue. For example, streaming data platform 230 may provide the set of instructions to server device 220 to stop processing the set of event messages and/or to cause server device 220 to power off.

In some implementations, streaming data platform 230 may provide information identifying whether streaming data platform 230 has identified a high demand or a low demand for server devices 220 based on the set of metrics (e.g., to server device 220). In this way, server device 220 may determine a manner in which to scale server devices 220, thereby conserving processing resources of streaming data platform 230.

In this way, streaming data platform 230 may provide a set of instructions to scale the quantity of server devices 220 prior to, or in association with, outputting information related to the values for the set of metrics.

As further shown in FIG. 4, process 400 may include outputting information related to the values for the set of metrics, the set of server devices, and/or processing of the set of event messages (block 460). For example, streaming data platform 230 may output (e.g., using computing resource 234, processor 320, communication interface 370, and/or the like) information related to the values for the set of metrics, the set of server devices, and/or processing of the set of event messages.

In some implementations, streaming data platform 230 may provide data (e.g., related to scaling of server devices 220 and/or processing of event messages) for display via a user interface (e.g., a dashboard) that is accessible via user device 210. For example, the user interface may provide various visualizations, analytics results, and/or the like for display. Additionally, or alternatively, streaming data platform 230 may provide a notification for display in association with providing the set of instructions. For example, the notification may include information that identifies that the quantity of server devices 220 included in the set of server devices 220 has been or is being scaled. In this way, streaming data platform 230 may perform an action to facilitate accessibility of data related to processing the set of event messages.

In some implementations, streaming data platform 230 may perform another action. In some implementations, and as an example, streaming data platform 230 may provide the data to a particular queue, of the set of queues, to provide one or more modules with accessibility to the data. For example, the one or more modules may relate to a machine learning technique, a threat detection technique, a fault detection technique, and/or the like.

In some implementations, streaming data platform 230 may process data related to processing of the set of event messages using a machine learning technique to identify a pattern in the data. For example, the pattern in the data may be used to predictively scale the quantity of server devices 220 included in the set of server devices 220. Continuing with the previous example, streaming data platform 230 may determine, based on a result of using the machine learning technique, that the pattern in the data is similar to a historical pattern of data. Continuing still with the previous example, a machine learning module associated with streaming data platform 230 may have trained a model on historical patterns of data and information identifying whether the historical patterns were associated with a need to scale server devices 220, an amount by which to scale server devices 220, and/or the like. This facilitates early identification of changes in data that may precede a need to scale server devices 220. Additionally, or alternatively, streaming data platform 230 may process the data to detect a threat to a system after providing the data to facilitate accessibility of the data.

In some implementations, streaming data platform 230 may trigger an alarm to indicate the presence of an issue related to processing of the event messages (e.g., that lag associated with processing the event messages satisfies a threshold). Additionally, or alternatively, streaming data platform 230 may send a message to user device 210 associated with a network administrator indicating an issue associated with processing of the set of event messages. Additionally, or alternatively, streaming data platform 230 may generate a report that includes information identifying a manner in which the set of server devices 220 were scaled, values for the set of metrics before and/or after scaling, and/or the like. Additionally, or alternatively, streaming data platform 230 may perform analytics on processing of the set of event messages and/or the set of server devices 220. For example, streaming data platform 230 may perform analytics on metrics related to processing of the set of event messages and/or on the set of server devices 220.

In this way, streaming data platform 230 may output information related to the values for the set of metrics.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
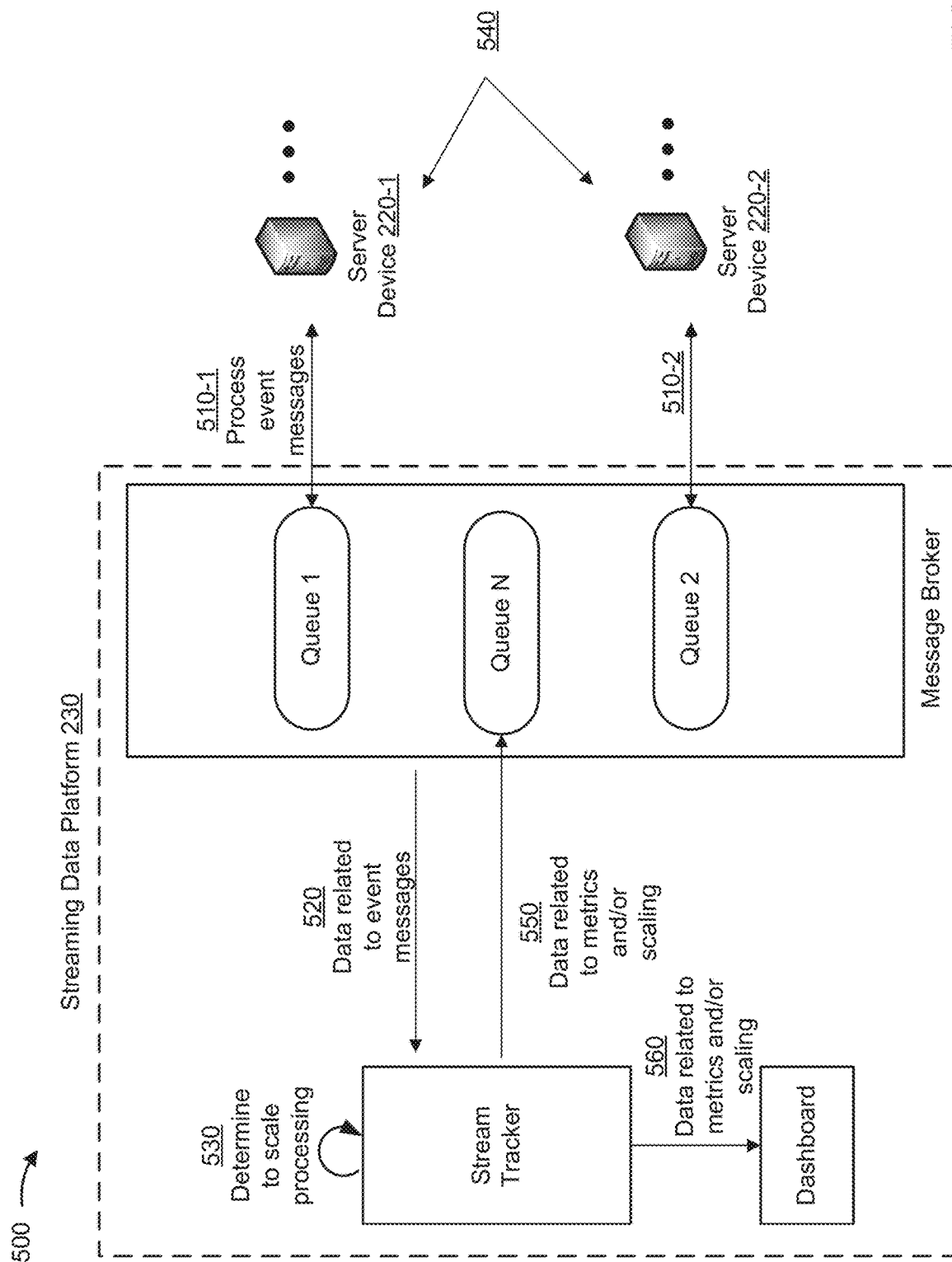
FIG. 5 is a diagram of an example implementation relating to the example process shown in FIG. 4.

FIG. 5 is a diagram of an example implementation 500 related to example process 400 shown in FIG. 4. FIG. 5 shows the interaction of various components and/or modules of streaming data platform 230 with respect to monitoring data streams and scaling computing resources based on the data streams. As shown in FIG. 5, implementation 500 includes a first set of server devices 220 that includes server device 220-1, a second set of server devices 220 that includes server device 220-2, and streaming data platform 230 that includes various components and/or modules, such as a message broker, a stream tracker, and a dashboard.

As shown in FIG. 5, and by reference numbers 510-1 and 510-2, sets of server devices 220 may process event messages stored in various corresponding queues (e.g., shown as "Queue 1" and "Queue 2"). For example, the queues may be associated with the message broker. In some implementations, the message broker may have received the event messages from user device 210 (not shown) and may have assigned the event messages to queues to be processed. As shown by reference number 520, the message broker may provide, to the stream tracker, data related to event messages. For example, the stream tracker may monitor a set of metrics related to the processing of the event messages using the data related to the event messages (e.g., may determine values for the set of metrics). As shown by reference number 530, the stream tracker may determine to scale processing of the event messages. For example, the stream tracker may determine to scale processing of the event messages based on values for the set of metrics.

As shown by reference number 540, streaming data platform 230 may scale the first set of server devices 220 and/or the second set of server devices 220 (e.g., by increasing or decreasing a quantity of server devices 220 included in each of the first set of server devices 220 and the second set of server devices 220). As shown by reference number 550, the stream tracker may provide, to a queue associated with the message broker (e.g., shown as "Queue N"), data related to metrics and/or scaling. For example, the queue to which the stream tracker provides the data may be available to a machine learning module, a threat detection module, and/or the like for further processing. As shown by reference number 560, the stream tracker may additionally provide data related to metrics and/or scaling for display via a dashboard associated with streaming data platform 230.

As indicated above, FIG. 5 is provided merely as an example. Other examples are possible and may differ from what was described with regard to FIG. 5.

In this way, streaming data platform 230 may process data related to processing of event messages to dynamically scale server devices 220 used to process the event messages. This improves an accuracy of scaling a quantity of server devices 220 used to process event messages. In addition, this improves a user experience of applications and/or user interfaces associated with the event messages being processed by facilitating quick fixing of issues related to processing of the event messages, facilitating faster processing of the event messages, and/or the like. Further, this reduces or eliminates a need to use scheduled and/or predictive scaling, thereby conserving processing resources associated with implementing predictive and/or scheduled scaling.

Although some implementations described herein were described with respect to processing event messages, the implementations apply equally to processing other types of data, such as commands, requests, and/or the like. Additionally, or alternatively, although some implementations described herein were described with regard to scaling server devices 220, the implementations apply equally to scaling other types of computing resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a set of event messages to be processed by a set of server devices,
        wherein the set of event messages are stored in a set of queues;
    determining, by the device, values for a set of metrics related to processing the set of event messages;
    determining, by the device, to modify a quantity of server devices included in the set of server devices based on a value, of the values for the set of metrics, being within a range of values;
    providing, by the device, a set of instructions to modify the quantity of server devices included in the set of server devices; and
    providing, by the device, information related to at least one of the values for the set of metrics, the set of server devices, or the processing of the set of event messages.

2. The method of claim 1, further comprising:
    providing the information to a particular queue, of the set of queues, to provide one or more modules with accessibility to the information,
        the one or more modules being associated with at least one of:
            a machine learning technique,
            a threat detection technique, or
            a fault detection technique.

3. The method of claim 1, wherein each queue of the set of queues is associated with a different subset of event messages and a different subset of server devices.

4. The method of claim 1, wherein a subset of server devices is scaled based on one or more of the values for the set of metrics meeting a threshold.

5. The method of claim 1, wherein providing the set of instructions comprises at least one of:
    providing the set of instructions to a set of additional server devices to cause the set of additional server devices to power on, or
    providing the set of instructions to one or more server devices in the set of server devices to cause the one or more server devices to power off.

6. The method of claim 1, wherein the information is presented via a dashboard, associated with a user device, that is accessible based on providing the set of instructions.

7. The method of claim 1, further comprising:
    providing a notification for display in association with providing the set of instructions,
        wherein the notification includes information identifying that the quantity of server devices included in the set of server devices is being scaled.

8. A device, comprising:
    one or more memories; and
    one or more processors communicatively coupled to the one or more memories, configured to:
        receive a set of event messages to be processed by a set of server devices;
        assign each of the set of event messages to a set of queues to prepare the set of event messages for processing by the set of server devices;
        determine values for a set of metrics related to processing the set of event messages;
        determine to scale a quantity of server devices included in the set of server devices based on a value, of the values for the set of metrics, being within a range of values; and
        provide a set of instructions to modify the quantity of server devices included in the set of server devices.

9. The device of claim 8, wherein the one or more processors are further configured to:
    provide information related to at least one of the values for the set of metrics, the set of server devices, or the processing of the set of event messages.

10. The device of claim 8, wherein each queue of the set of queues is associated with a different subset of event messages and a different subset of server devices.

11. The device of claim 8, wherein a subset of server devices is scaled based on one or more of the values for the set of metrics meeting a threshold.

12. The device of claim 8, wherein the one or more processors, when providing the set of instructions, are configured to:
    provide the set of instructions to cause one or more additional server devices to process the set of event messages for a particular queue of the set of queues.

13. The device of claim 8, wherein the one or more processors, when providing the set of instructions, are configured to:
    provide the set of instructions to cause one or more additional server devices to power on and process the set of event messages for a particular queue of the set of queues.

14. The device of claim 8, wherein the one or more processors are further configured to:
    provide a notification for display in association with providing the set of instructions,
        wherein the notification includes information identifying that the quantity of server devices included in the set of server devices is being scaled.

15. A non-transitory computer-readable medium storing instructions, the instructions comprising:
    one or more instructions that, when executed by one or more processors, cause the one or more processors to:
        receive a set of event messages to be processed by a set of server devices;
        determine values for a set of metrics related to processing the set of event messages being processed, by the set of server devices, from a set of queues,
            the values for the set of metrics being determined as the set of event messages are being processed;

determine to scale a quantity of server devices included in the set of server devices based on a value, of the values for the set of metrics, being within a range of values;

provide a set of instructions to modify the quantity of server devices included in the set of server devices; and provide information related to at least one of the values for the set of metrics, the set of server devices, or the processing of the set of event messages.

16. The non-transitory computer-readable medium of claim 15, wherein the one or more instructions, when executed by the one or more processors, further cause the one or more processors to:

perform an action to facilitate accessibility of data related to the processing of the set of event messages; and provide the data to a particular queue, of the set of queues, to provide one or more modules with accessibility to the data, the one or more modules being associated with at least one of:
a machine learning technique,
a threat detection technique, or
a fault detection technique.

17. The non-transitory computer-readable medium of claim 16, wherein the one or more instructions, when executed by the one or more processors, further cause the one or more processors to:

process the data to detect a threat to a system after providing the data to facilitate accessibility of the data.

18. The non-transitory computer-readable medium of claim 15, wherein the one or more instructions, when executed by the one or more processors, further cause the one or more processors to:

determine a score for each metric, of the set of metrics, based on at least one of:
each metric satisfying a threshold,
each metric being within a threshold amount of a historical average value, or
each metric being within a threshold amount of an expected value; and utilize the score to determine whether to scale the quantity of server devices.

19. The non-transitory computer-readable medium of claim 15, wherein the one or more instructions, that cause the one or more processors to provide the set of instructions, cause the one or more processors:

provide the set of instructions to cause one or more additional server devices to power on or to power down the one or more additional servers.

20. The non-transitory computer-readable medium of claim 15, wherein the information is presented via a dashboard, associated with a user device, that is accessible based on providing the set of instructions.

* * * * *